United States Patent
Baek (10) Patent No.: US 7,436,472 B2
(45) Date of Patent: Oct. 14, 2008

(54) LIQUID CRYSTAL DISPLAY DEVICE AND METHOD WITH COLOR FILTERS HAVING OVERCOAT LAYER THEREOVER FORMED ON SUBSTRATE EXCEPT FOR FOURTH COLOR FILTER FORMED ON THE OVERCOAT LAYER

(75) Inventor: Heume Il Baek, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 467 days.

(21) Appl. No.: 11/318,572

(22) Filed: Dec. 28, 2005

(65) Prior Publication Data
US 2006/0139515 A1    Jun. 29, 2006

(30) Foreign Application Priority Data
Dec. 29, 2004   (KR) .................. 10-2004-0114719

(51) Int. Cl.
*G02F 1/1335* (2006.01)
*G02F 1/1339* (2006.01)

(52) U.S. Cl. .................. 349/106; 349/107; 349/108; 349/155

(58) Field of Classification Search ......... 349/106–109, 349/155–157
See application file for complete search history.

(56) References Cited

U.S. PATENT DOCUMENTS

| 7,212,262 | B2 * | 5/2007 | Kang ........................ 349/106 |
| 2005/0117092 | A1 * | 6/2005 | Park et al. .................. 349/106 |

* cited by examiner

*Primary Examiner*—David C. Nelms
*Assistant Examiner*—John Heyman
(74) *Attorney, Agent, or Firm*—Birch, Stewart, Kolasch & Birch, LLP (57) ABSTRACT

An LCD device and a method of manufacturing the same are provided. The LCD device according to an embodiment includes a black matrix having a plurality of open regions on a substrate; a color filter layer including a first color filter pattern, a second color filter pattern, and a third color filter pattern that are formed in the open regions; an overcoat layer formed on the color filter layer; a column spacer formed in a first region on the overcoat layer; and a fourth color filter pattern formed in a second region on the overcoat layer.

34 Claims, 6 Drawing Sheets

LIQUID CRYSTAL DISPLAY DEVICE AND METHOD WITH COLOR FILTERS HAVING OVERCOAT LAYER THEREOVER FORMED ON SUBSTRATE EXCEPT FOR FOURTH COLOR FILTER FORMED ON THE OVERCOAT LAYER

This application claims, under 35 U.S.C. §119, the priority benefit of the Korean Patent Application No. 10-2004-0114719 filed on Dec. 29, 2004 in Republic of Korea, the entire contents of which are hereby fully incorporated by reference.

BACKGROUND OF THE INVENTION

1. Field of the Invention

The present invention relates to a liquid crystal display (LCD) device, and more particularly, to an LCD device with RGBW pixels and a method of manufacturing the LCD device.

2. Description of the Related Art

LCD devices are considered to be the next generation of high technology and advanced display devices because of low power consumption and high portability.

Among the LCD devices, an active matrix type LCD device, which includes thin film transistors as switching units to drive its pixels independently, is mostly considered to the next generation of display device because of its high resolution and moving picture displaying ability.

A manufacturing process of the LCD device according to the related art includes forming an array substrate with thin film transistors and pixel electrodes, forming a color filter substrate with color filters and common electrodes, and forming liquid cells between the array substrate and the color filter substrate.

Such an LCD device is called a twisted nematic (TN) mode LCD device. The TN mode LCD device drives liquid crystal molecules disposed between the two substrates in a 90-degree twisted fashion by applying a voltage to the electrodes formed on the two substrates.

The TN mode LCD device according to the related art, however, has a considerable drawback of a narrow viewing angle. To solve the narrow viewing angle problem, LCD devices having various modes are being developed. For example, an in-plane switching (IPS) mode and an optically compensated birefringence (OCB) mode have been developed.

In the IPS mode LCD device, liquid crystal molecules are driven in parallel with substrates by an in-plane electric field generated by applying a voltage to two electrodes formed on the same substrate. That is, the long axes of the liquid crystal molecules are not erected with respect to the substrates. And, since the index of birefringence of the liquid crystal varies little in a clockwise direction, the IPS mode LCD device has a greatly improved viewing angle when compared with the TN mode LCD device according to the related art.

Figure 1:
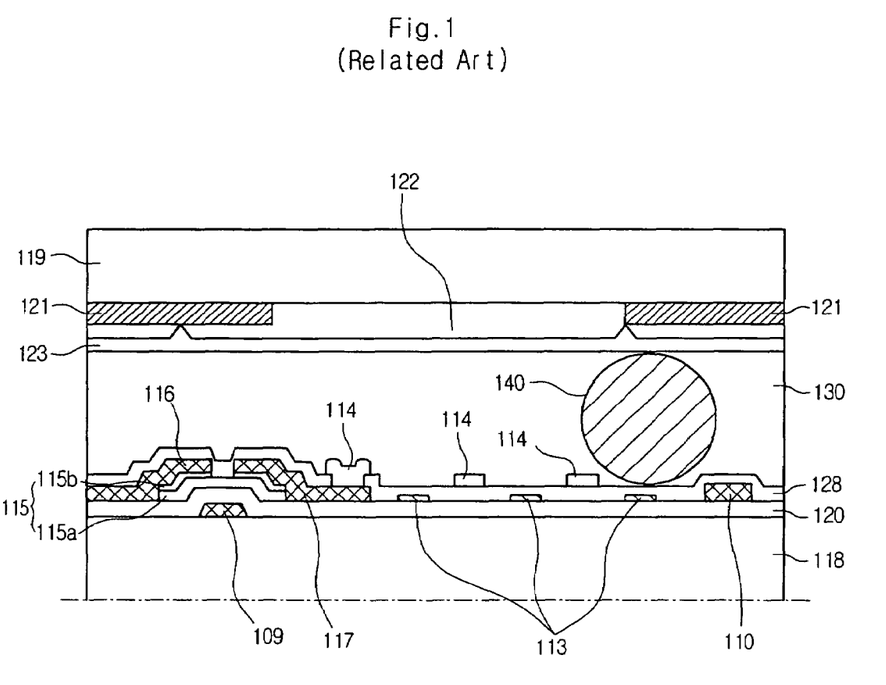
FIG. 1 is a cross-sectional view of an IPS mode LCD device according to a related art.

FIG. 1 is a cross-sectional view of an IPS mode LCD device according to the related art.

Referring to FIG. 1, the related art IPS mode LCD device includes a first substrate 118, a second substrate 119 attached to the first substrate 118, and a liquid crystal layer 130 injected between the first and second substrates 118 and 119.

By depositing metal on the first substrate 118 and patterning the deposited metal, a plurality of gate lines (not shown) are formed on the first substrate 118, and at the same time, a gate electrode 109 branched from the corresponding gate line is formed in each thin file transistor region.

A gate insulating layer 120 is formed entirely over the first substrate 118 including the gate electrode 109, and a semiconductor layer 115 including an active layer 115a and an ohmic contact layer 115b is formed on top of the gate insulating layer 120.

By depositing and patterning metal on top of the gate insulating layer 120, a plurality of data lines 110 (one data line is shown in FIG. 1) perpendicularly crossing the gate lines are formed on the gate insulating layer 120. Also, separated source/drain electrodes 116 and 117 are formed on the gate insulating layer 120 at a position appropriately related to the gate electrode 109. Further, a common line (not shown) and a plurality of common electrodes 113 are formed on the gate insulating layer 120.

Pixel regions are defined by the gate lines and the data lines 110 and a thin film transistor is provided in each pixel region. Further, each thin film transistor is formed by the gate electrode 109, the semiconductor layer 115, and the source/drain electrodes 116 and 117 in the corresponding pixel region. The common electrodes 113 are arranged in the pixel regions at predetermined intervals.

A protective layer 128 is formed entirely over the first substrate 118. A pixel electrode 114 is electrically connected with the drain electrode 117 in parallel with the common electrodes 113. A first alignment layer (not shown) is formed entirely over the first substrate 118.

A black matrix 121 is formed on the second substrate 119 to face the gate lines, the data lines, and the thin film transistors in order to selectively block light. A color filter layer 122 having red, green, blue color filter patterns is formed in open regions defined by the back matrix 121. An overcoat layer 123 planarizes a top surface of the color filter layer 122 and protects the color filter layer 122. A second alignment layer (not shown) is formed on the over coating layer 123.

Meanwhile, edges of the first and second substrates 118 and 119 are sealed up with a seal pattern (not shown) to prevent leakage of the crystal layer 130 interposed between the first and second substrates 118 and 119. A ball spacer 140 is interposed between the first and second substrates 118 and 119. The ball spacer 140, together with the seal pattern, maintains a predetermined gap between the first and second substrate 118 and 119.

The ball spacer 140 is made of glass fiber or organic material that has elasticity. Ball spacers 140 are randomly distributed through the first and second the substrates 118 and 119, which however causes the following problems.

Movement of the ball spacers 140 causes the alignment layers to detach. Further, attractive force of liquid crystal molecules around the ball spacers causes leakage of light around the ball spacers. Moreover, a cell gap cannot be stably kept using the ball spacers in a large-sized LCD device.

Figure 2:
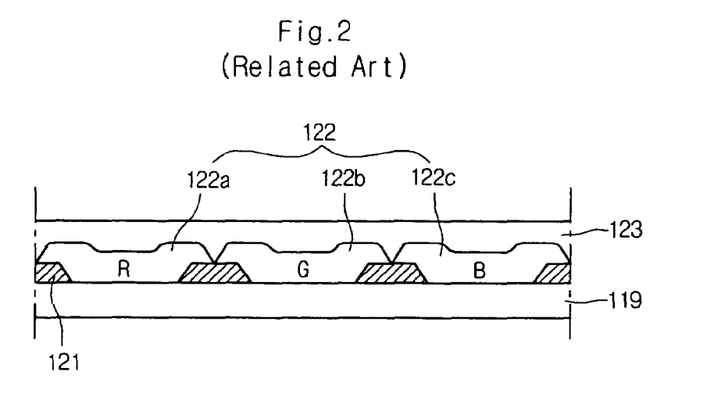
FIG. 2 is a cross-sectional view of a certain region of the second substrate 119 depicted in FIG. 1.

FIG. 2 is a cross-sectional view of a certain region of the second substrate 119 depicted in FIG. 1. Here, the certain region represents one RGB color filter pattern region defining one pixel. Referring to FIG. 2, the black matrix 121 is formed on the second substrate 119 in an evenly-spaced fashion. A red color filter pattern 122a, a green color filter pattern 122b, and a blue color filter pattern 122c are sequentially formed in the open regions defined by the back matrix 121. The red, green, and blue color filter patterns 122a, 122b, and 122c make up the color filter layer 122.

The overcoat 123 is formed on the color filter layer 122. The overcoat layer 123 is formed of organic material having a high polarization characteristic.

As mentioned above, in the second substrate 119 (color filter substrate), the red, green, and blue color filter patterns make up one pixel. However, in the case where the red, green, and blue color filter patterns make up one pixel, light transmittance is low and thereby brightness is also low.

Although the brightness of the IPS mode LCD device can be increased by increasing the brightness of the light generated by a backlight unit or the number of optical sheets in the LCD device, this increases manufacturing cost. Further, increasing current input to increase the brightness of the IPS mode LCD device destroys the desired low-power consumption characteristic of the LCD device.

SUMMARY OF THE INVENTION

Accordingly, the present invention is directed to an LCD device that substantially obviates one or more problems due to limitations and disadvantages of the related art.

An object of the present invention is to provide an LCD device that has a unit pixel defined by red, green, blue, and white color filter patterns, the white color filter pattern being simultaneously (or sequentially) formed together with a column spacer on a substrate to simplify manufacturing process with less operations and to decrease manufacturing cost.

Another object of the present invention is to provide a method of manufacturing an LCD device that has a unit pixel defined by red, green, blue, and white color filter patterns, the white color filter pattern being simultaneously (or sequentially) formed together with a column spacer on a substrate to simplify manufacturing process with less operations and to decrease manufacturing cost.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided according to one embodiment a liquid crystal display (LCD) device comprising: a black matrix having a plurality of open regions on a substrate; a color filter layer including a first color filter pattern, a second color filter pattern, and a third color filter pattern that are formed in the open regions; an overcoat layer formed on the color filter layer; a column spacer formed in a first region on the overcoat layer; and a fourth color filter pattern formed in a second region on the overcoat layer.

In another aspect of the present invention, there is provided a method of manufacturing a liquid crystal display (LCD) device, the method comprising: forming a black matrix with a plurality of open regions on a substrate; forming first, second and third color filter patterns in the open regions; forming an overcoat layer on the substrate including the first, second and third color filter patterns; and forming a column spacer and a fourth color filter pattern on the overcoat layer.

In another aspect of the present invention, there is provided a liquid crystal display (LCD) device comprising: a black matrix pattern on first regions of a substrate; first, second and third color filter patterns on second regions of the substrate; an overcoat layer to cover the substrate including the black matrix pattern and the first, second and third color filter patterns; and a fourth color filter pattern on the overcoat layer.

In another aspect of the present invention, there is provided a method of forming a liquid crystal display (LCD) device, the method comprising: forming a black matrix pattern on first regions of a substrate; forming first, second and third color filter patterns on second regions of the substrate; forming an overcoat layer to cover the substrate including the black matrix pattern and the first, second and third color filter patterns; and forming a fourth color filter pattern on the overcoat layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

There is an increasing need for a high-resolution Liquid crystal display (LCD) device. To satisfy the increasing need, the aperture ratio of each pixel may be reduced. However, this also lowers the brightness of the LCD device. Therefore, this lowering of the brightness should be compensated for.

For this reason, the RGB three-color configuration of the color filter substrate of the LCD device depicted in FIG. 2 according to the related art is changed to a RGBW four-color configuration in the present invention. The added White dot increases the brightness of an LCD device by, e.g., 50%. This RGBW technology is being developed.

Figure 3:
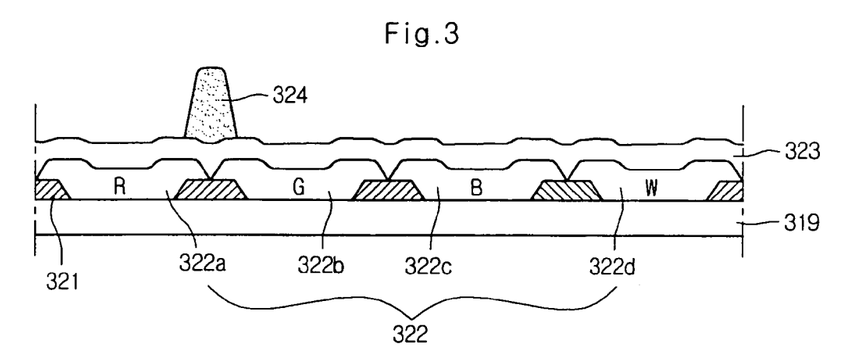
FIG. 3 is a cross-sectional view of a color filter substrate of an LCD device with a RGBW color filter unit pixel according to an embodiment of the present invention.

FIG. 3 is a cross-sectional view of a color filter substrate of an LCD device with a RGBW color filter unit pixel according to an embodiment of the present invention. FIG. 3 represents a unit pixel region defined by red, green, blue, and white color filter patterns.

Referring to FIG. 3, a black matrix 321 is formed on a substrate 319 in an evenly-spaced or substantially evenly-spaced fashion. A red color filter pattern 322a, a green color filter pattern 322b, a blue color filter pattern 322c, and a white filter pattern 322d are sequentially formed in open regions defined by the back matrix 321. The red, green, blue, and white color filter patterns 322a, 322b, 322c, and 322d make up a color filter layer 322 for each unit pixel region.

By adding the white color filter pattern 322d to the red, green, and blue color filter patterns 322a, 322b, and 322c, a white dot is additionally defined. The white dot increases brightness by approximately 50%.

An overcoat layer 323 is formed on the color filter layer 322. The overcoat layer 323 can be formed of an organic material having a high polarization characteristic.

A column spacer 324 is formed at a predetermined position on the overcoat layer 323 through photolithography using a photosensitive organic photoresist. The photolithography includes exposing and developing. The column spacer 324 may be formed above or over the portion(s) of the black matrix 321 as shown in FIG. 3.

The column spacer 324 obviates the disadvantages of the related art ball spacer. The column spacer 324 can maintain a cell gap stably. Also, since the column spacer 324 can be fixed at a region (e.g., a region above the black matrix 321) through which light is not transmitted, light leakage can be prevented around the column spacer 324, thereby increasing the contrast ratio of the LCD device. Further, since the column spacer 324 is fixedly formed, the color filter substrate can have a stronger and more stable structure and thus it can be easily used for a large-sized LCD device.

FIGS. 4A to 4E are cross-sectional views showing a method of manufacturing the color filter substrate with the RGBW color filter unit pixel depicted in FIG. 3.

Figure 4A:
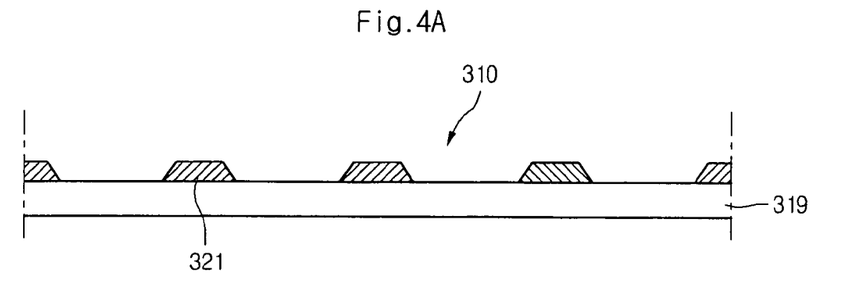
FIGS. 4A to 4E are cross-sectional views showing a method of manufacturing the color filter substrate depicted in FIG. 3 according to an embodiment of the present invention.

Referring to FIG. 4A, a black matrix 321 is formed on a substrate 319 by depositing (or coating) metal or resin entirely over the substrate 319 and performing photolithography on the substrate 319.

The black matrix 321 prevents light leakage caused by abnormal behavior of liquid crystal molecules disposed outside a pixel electrode region. Also, the black matrix. 321 blocks incident light to a channel region of a thin film transistor.

The black matrix 321 defines open regions 310 that are evenly or substantially evenly distributed on the substrate 319.

Figure 4B:
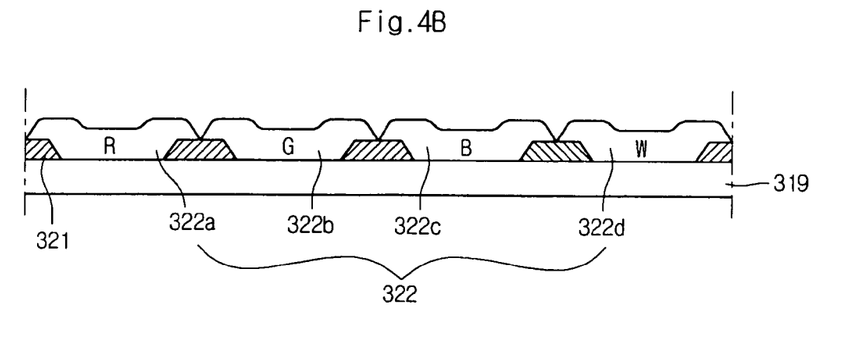

Referring to FIG. 4B, red, green, blue, and white color filter patterns 322a, 322b, 322c, and 322d are sequentially or in a certain order formed in the open regions 310 by using the black matrix 321 as a boundary region.

The color filter patterns 322a, 322b, 322c, and 322d have red, green, blue, and white colors, respectively. The color filter patterns 322a, 322b, 322c, and 322d can be formed through a pigment dispersion, dyeing, electro-deposition or the like. The pigment dispersion is widely used because of its high precision and reproduction characteristics.

One example of forming the color filter patterns 322a, 322b, 322c, and 322d using the pigment dispersion will now be described. However, the present invention covers using other techniques to form the color filter patterns 322a-322d.

First, a color resist of red, green, blue, or white color (e.g., a red color resist) is deposited entirely over the substrate 319 (including the black matrix 321) through spin coating or the like. Next, a mask defining light-transmitting regions and opaque regions is placed on the substrate 319 and then exposing is performed on the substrate 319. Next, the exposed color resist is developed. Since the color resist has in this example a negative characteristic, light-exposed regions are remained and non-exposed regions are removed from the color photo resist after the developing. In another example, a positive type color resist may be used. Accordingly, the red color filter pattern 322a can be formed. After that, curing is performed to harden the red color filter pattern 322a. In this way, the green, blue, and white color filter patterns 322b, 322c, and 322d can be formed sequentially.

Generally, the red, green, blue, and white color filter patterns 322a, 322b, 322c, and 322d are formed in the open regions 310. The red, green, blue, and white color filter patterns 322a, 322b, 322c, and 322d make up the color filter layer 322.

Figure 4C:
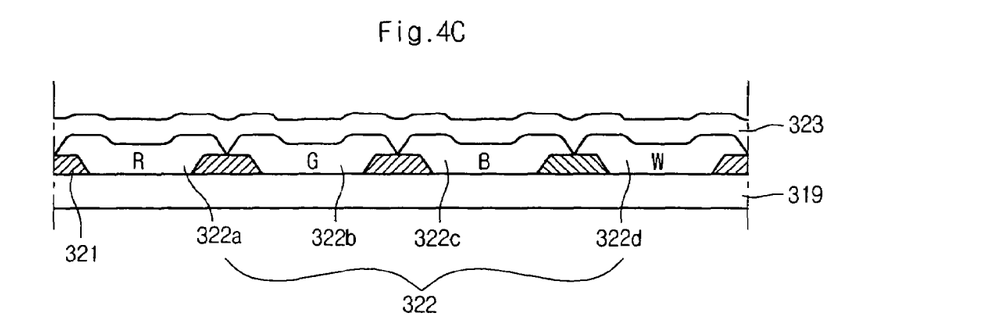

After the color filter layer 322 is formed as described above, an overcoat layer 323 is formed on the color filter layer 322 as shown in FIG. 4C. The overcoat layer 323 can be formed of an organic material having a high planarization characteristic.

Figure 4D:
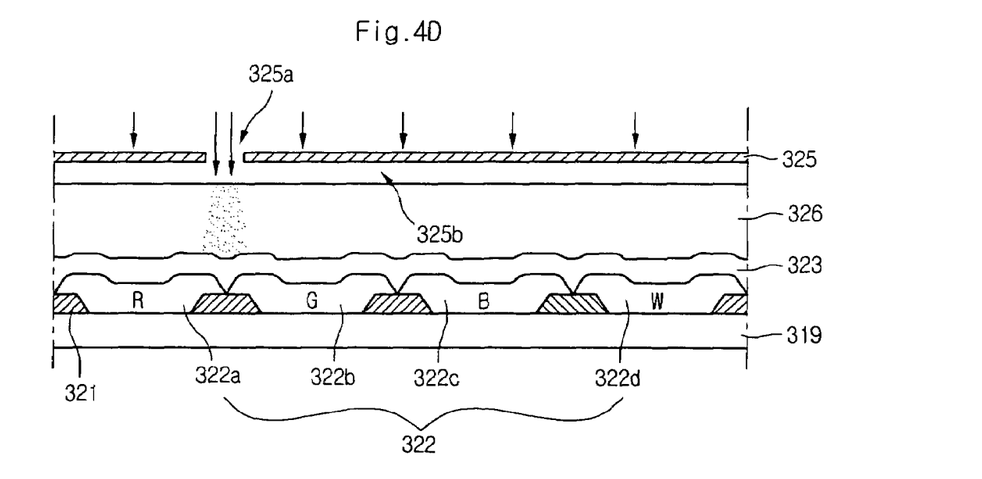

Referring to FIG. 4D, the overcoat layer 323 is coated with a negative type photoresist 326 having the same photosensitive characteristic as the color filter layer 322. Then, a mask 325 is aligned on the negative type photoresist 326, and the negative type photoresist 326 is exposed to form one or more column spacers. For instance, in detail, the mask 325 includes a transmitting region 325a facing the black matrix portion, and an opaque region 325b. If light is projected to the substrate 319 through the mask 325, a region of the negative type photoresist 326 facing the transmitting region 325a is remained as a pattern, and the other portion of the negative type photoresist 326 facing the opaque region 325b is removed.

Figure 4E:
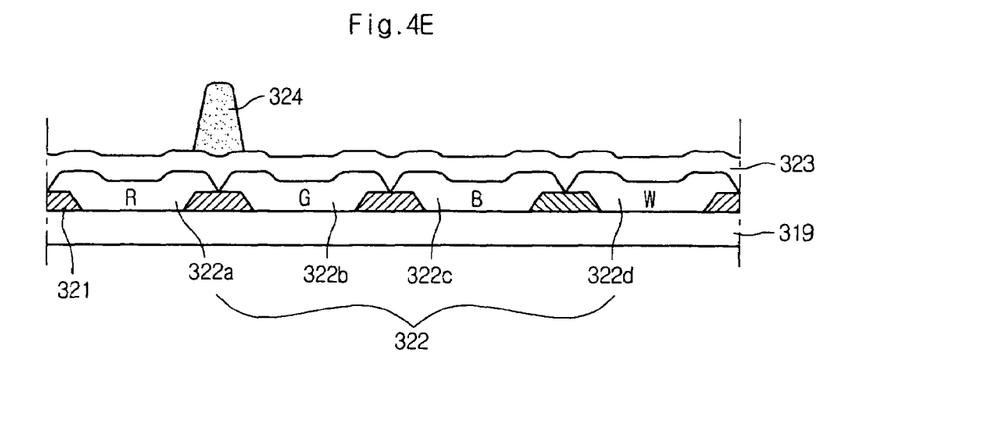

As a result, referring to FIG. 4E, a column spacer 324 is formed by the pattern. Here, hardening treatment can be performed on the column spacer 324 after the column spacer 324 is developed to stabilize the column spacer 324.

In this example, the column spacer 324 is overlapped with the black matrix 321. That is, the column spacer 324 is formed above the black matrix 321. In the present invention, one or more column spacers 324 may be formed using the above process. In the alternative, multiple column spacers may be formed simultaneously using a mask having a plurality of transmitting regions 325a.

Thus, using the method discussed above, the color filter substrate having the RGBW four-color unit pixel for an LCD device can be manufactured. This method addresses the limitations associated with the related art color filter substrate of an LCD.

Although effective, in the method discussed above, seven operations are totally required until the column spacer 324 is formed: forming the black matrix 321→forming the red color filter pattern 322a→forming the green color filter pattern 322b→forming the blue color filter pattern 322c→forming the white color filter pattern 322d→forming the overcoat layer 319→forming the column spacer 324. When compared with the related art color filter substrate having the RGB three-color unit pixel, one additional operation, that is, forming the white color filter pattern, is added, thereby decreasing unit per hour (productivity). Accordingly, the manufacturing process discussed above involves an addition operation, and the manufacturing cost may not be reduced drastically.

Thus the present invention according to an embodiment addresses the issues associated with the method of FIGS. 4A-4E. In this embodiment, when forming the red, green, blue, and white color filter patterns to constitute a unit pixel, the white color filter pattern and the column spacer are formed at the same time or sequentially without using an additional mask or coating operation for the white color filter pattern.

Figure 5:
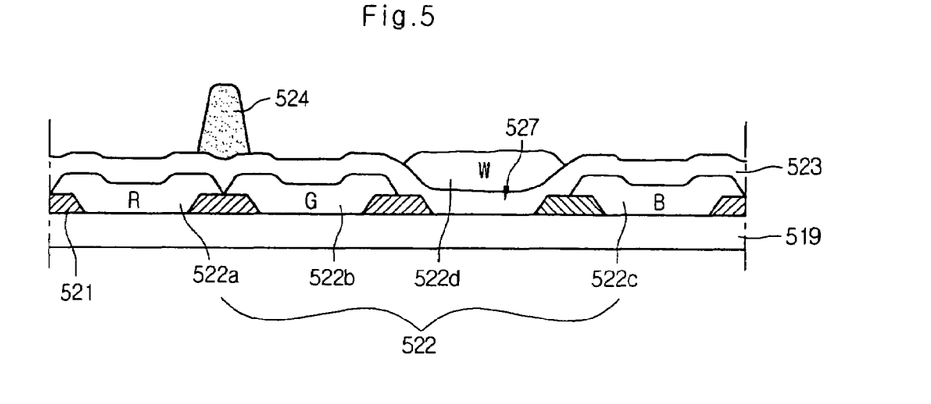
FIG. 5 is a cross-sectional view of a color filter substrate of an LCD device with a RGBW color filter unit pixel according to another embodiment of the present invention.

FIG. 5 is a cross-sectional view of a color filter substrate of an LCD device with a RGBW color filter unit pixel according to an embodiment of the present invention. FIG. 5 represents a unit pixel region defined by red, green, blue, and white color filter patterns. Although FIG. 5 shows a color filter substrate of an IPS mode LCD device, the color filter substrate of the present invention is not limited to the IPS mode LCD device.

Referring to FIG. 5, a black matrix 521 is formed on a substrate 519 in an evenly-spaced or substantially evenly-spaced fashion. A red color filter pattern 522a, a green color filter pattern 522b, and a blue color filter pattern 522c are sequentially formed in open regions 527 defined by the back matrix 521. At this time, an open region 527 of the black matrix 521 adjacent to the red, green, and blue color filter patterns 522a, 522b, and 522c is remained empty instead of forming a white color filter pattern.

Since the color filter substrate has a RGBW four-color structure, a white color filter pattern can be formed in the open region 527 defined by the black matrix 521 when a column spacer is formed.

For this, first, an overcoat layer 523 is formed entirely over the substrate 519 including the color filter patterns 522a, 522b, and 522c. Next, a column spacer 524 and a white color filter pattern 522d are formed in a predetermined pattern through photolithography using a photosensitive organic material. In other words, the white color filter pattern 522d is formed at the same time or substantially at the same time as the column spacer 524. The column spacer 524 is formed at a region corresponding to the black matrix 521, and the white color filter pattern 522d is formed at a region corresponding to the open region 527.

Therefore, the red, green, and blue color filter patterns 522a, 522b, and 522c are formed directly on the substrate 519, and the white color filter pattern 522d is formed in a different layer from the respective color filter patterns 522a, 522b, and 522c. That is, the white color filter pattern 522d is formed directly on the overcoat layer 523.

In the present invention, the red, green, blue color filter patterns 522a, 522b, and 522c are formed in the same layer, and a certain region, that is, the open region 527, defined by the black matrix 521 is left empty without forming any color filter pattern. Next, the overcoat layer 523 is formed on the color filter patterns 522a, 522b, and 522c. Then, the white color filter pattern 522d is formed in the open region 527, and at the same time, the column spacer 524 is formed above the black matrix 521. Therefore, the white color filter pattern 522d is formed of the same material as the column spacer 524.

As a result, a color filter layer 522 having a unit pixel defined by the red, green, blue, and white color filter patterns 522a, 522b, 522c, and 522d is formed.

In this way, the white color filter pattern 522d is added to the red, green, and blue color filter patterns 522a, 522b, and 522c, and thus brightness can be increased by approximately 50%. Further, since the white color filter pattern 522d is formed together with the column spacer 524 at the same time or sequentially without using an additional mask or coating operation, the manufacturing process for the LCD device can be simplified with a less number of operations and the manufacturing cost can also be decreased. That is, the present invention improves the process efficiency and yield of an LCD device.

FIG. 6A to 6E are cross-sectional views showing a method of manufacturing the color filter substrate with the RGBW color filter unit pixel depicted in FIG. 5 according to an embodiment of the present invention.

Although FIGS. 6A to 6E show a color filter substrate of an IPS mode LCD device, the color filter substrate of the present invention is not limited to the IPS mode LCD device.

Figure 6A:
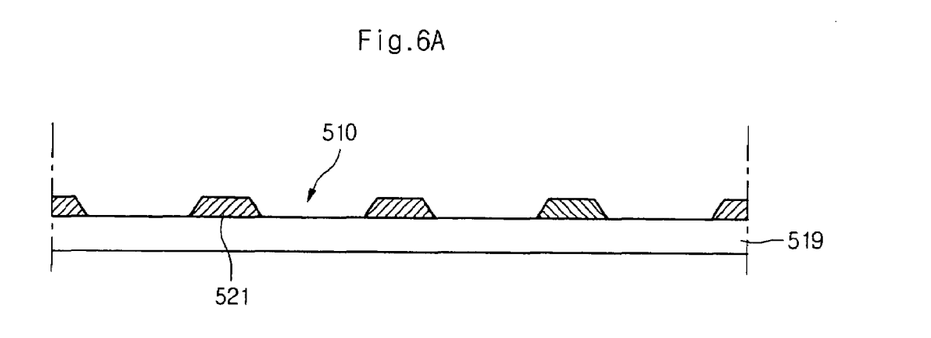
FIGS. 6A to 6E are cross-sectional views showing a method of manufacturing the color filter substrate depicted in FIG. 5 according to an embodiment of the present invention.

Referring to FIG. 6A, a black matrix 521 is formed on a substrate 519 by depositing (or coating) metal or resin entirely over the substrate 519 and performing photolithography on the substrate 319.

The black matrix 521 prevents light leakage caused by abnormal behavior of liquid crystal molecules disposed outside a pixel electrode region. Also, the black matrix 521 blocks incident light to a channel region of a thin film transistor.

The black matrix 521 defines open regions 510 that are evenly or substantially evenly distributed on the substrate 519. In other words, portions of the black matrix 521 are formed between the open regions 510.

In the present invention, RGBW four-color structure constitutes a unit pixel. Therefore, color filter patterns corresponding to RGBW will be formed in the adjoining four open regions 510.

Figure 6B:
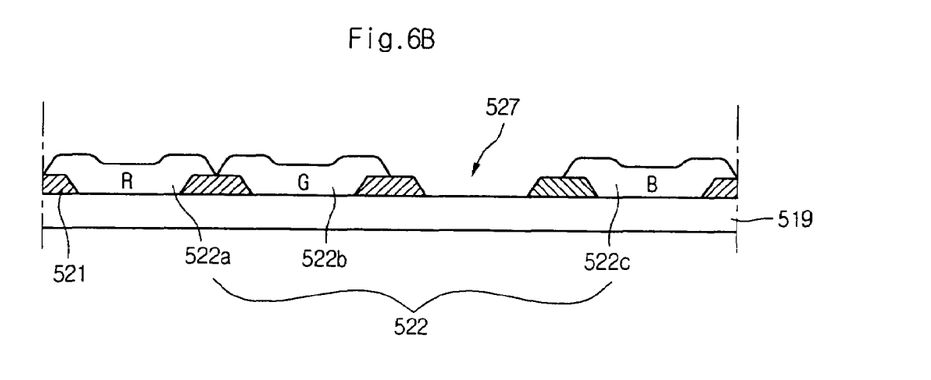

Referring to FIG. 6B, red, green, and blue color filter patterns 522a, 522b, and 522c are sequentially or in some order formed in the open regions 510 by using the black matrix 521 as a boundary region. Thereafter, one of the open regions 510 remains as an empty region 527 where no color filter pattern is formed. Each of the red, green, and blue color filter patterns 522a, 522b, and 522c can have a thickness of about 2 μm.

The color filter patterns 522a, 522b, and 522c are formed through a pigment dispersion, dyeing, electro-deposition or the like. The pigment dispersion is widely used because of its high precision and reproduction characteristics. One example of forming color filter patterns using the pigment dispersion is already described with reference to FIGS. 4A and 4B. Thus, description thereof will be omitted.

In the method of FIGS. 4A-4E, since the color filter substrate with the RGBW color structure uses an additional operation to form the white color filter pattern through the pigment dispersion or the like, manufacturing process may not be shortened and thereby unit per hour (productivity) may not increase.

However, in the method of FIGS. 6A-6E according to the present invention, forming the white color filter pattern is not individually performed. The formation of the white color filter pattern is included in the step of forming the column spacer. That is, the white color filter pattern is formed together with the column spacer at the same time or sequentially. Therefore, manufacturing process can be simplified with a fewer operations and therefore production yield can be further improved.

Figure 6C:
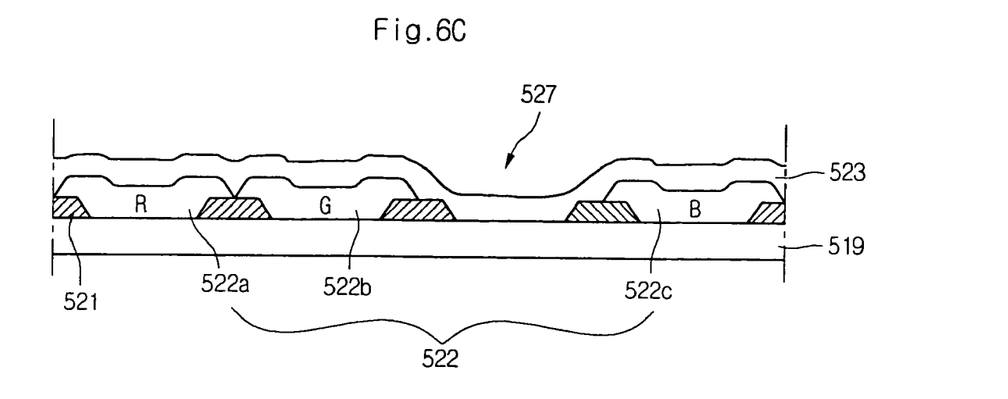

Referring to FIG. 6C, an overcoat layer 523 is formed on the substrate 519 including the color filter patterns 522a, 522b, and 522c. The overcoat layer 523 can be formed of an organic material having a high planarization characteristic. Although the overcoat layer 523 is formed on the entire surface of the substrate 519, the overcoat layer 523 is concaved at the empty region 527. The overcoat layer 523 can be formed of a transparent material such as acryl resin. The overcoat layer 523 can have a thickness of about 1.5 μm. Specifically, the overcoat layer 523 may has a thickness of about 1.5 μm to about 2.0 μm at the empty region 527.

Figure 6D:
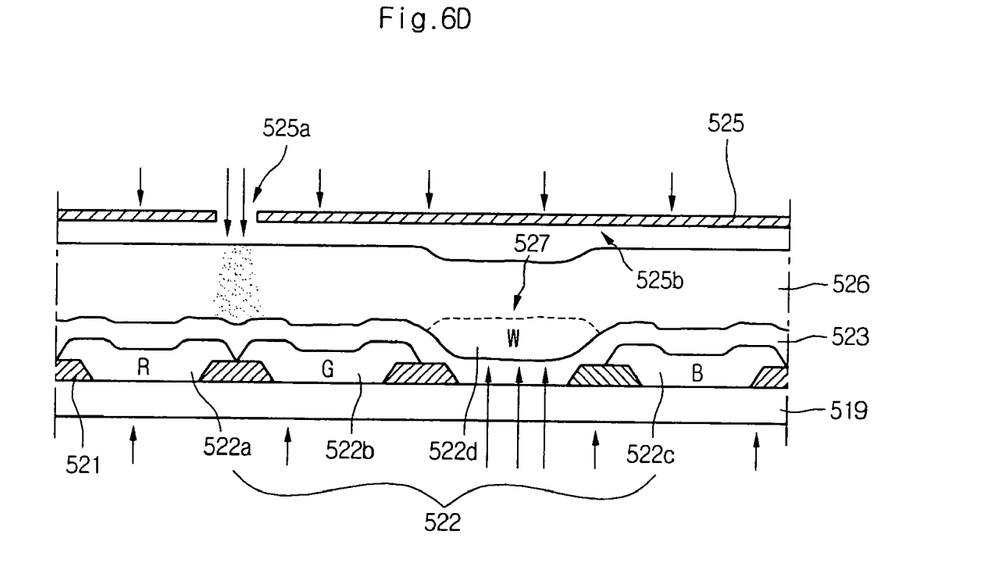

Referring to FIG. 6D, the overcoat layer 523 is coated with a negative type photoresist 526 having the same photosensitive characteristic as the color filter patterns 522a, 522b, and 522c. In this example, the negative type photoresist 526 includes transparent acryl. In another example, a positive type photoresist may be used. Then, a mask 525 is aligned on the negative type photoresist 526, and the negative type photoresist 526 is exposed. Here, the other side of the substrate 519 may be exposed. The negative type photoresist 526 is formed of a transparent material such as a negative type acryl resin. The negative type photoresist 526 is hardened when exposed to light.

A column spacer is formed through exposing using the mask 525 formed above the substrate 519, and a white color filter is formed through exposing performed on a bottom of the substrate 519.

Since the column spacer and the white color filter pattern have different thicknesses, the exposing is individually performed from the top and bottom of the substrate 519. That is, if the exposing is only performed from the top of the substrate 519, the column spacer and the white color filter have the same thickness.

Therefore, in the present invention, the column spacer, which is relatively thicker than the white color filter pattern, can be formed by exposing the top of the substrate 519, and the white color filter pattern, which is relatively thinner than the column spacer, can be formed by exposing the bottom of the substrate 519. These are indicated by different arrows in FIG. 6D. Since light projected from a back of the substrate 519 substrate 519 passes through the substrate 519 and the overcoat layer 523 and reaches the negative type photoresist 526, the negative type photoresist 526 formed in the empty region 527 is partially hardened at a lower portion. The white color pattern can have a thickness smaller than that of the column spacer.

An additional mask is not required for the bottom of the substrate 519 because the black matrix 521 and the respective color filter patterns 522a, 522b, and 522c are opaque. That is, projected light can reach only the empty region 527. Therefore, the white color filter can be easily formed by projecting light to the bottom of the substrate 519 without using an additional mask.

In more detail, the mask 525 includes a transmitting region 525a facing the black mask 521 and an opaque region 525b. When light is projected to the substrate 519 through the mask 525, a region of the negative type photoresist 526 facing the transmitting region 525a is remained as a pattern, and the other portion of the negative type photoresist 526 facing the opaque region 525b is removed. As a result, the column spacer 526 is formed, which is the remained photoresist pattern.

Further, when light is projected to the bottom of the substrate 519, a portion of the negative type photoresist 526 facing the black mask 521 and the color filter patterns 522a, 522b, and 522c is not exposed to the light but the other portion of the negative type photoresist 526 facing the empty region 527 is exposed to the light. The exposed portion of the photoresist 526 is hardened and thus becomes the white color filter pattern 522d.

Until now, it is explained that the exposing of the photoresist 526 is simultaneously performed from the top and bottom of the substrate 319. However, the present invention is not limited to the explained example. The exposing of these portions of the photoresist 526 can be sequentially performed.

Since the photoresist 526 is a negative type photoresist, hardening starts from a portion exposed to light. Therefore, the thickness of the white color filter pattern can be determined by adjusting the amount of incident light to the bottom of the substrate 519.

Preferably, the amount of incident light to the bottom of the substrate 519 is adjusted such that a gap between the white color filter pattern and other color filter patterns is 0.2 µm or less.

Figure 6E:
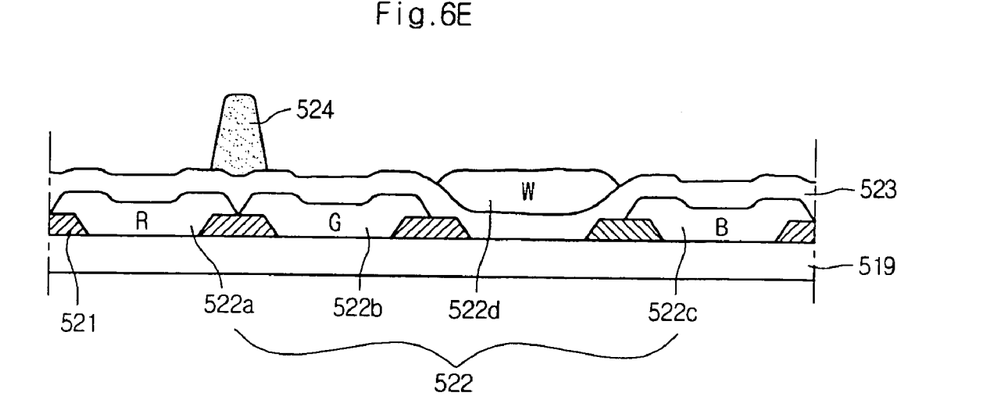

Referring to FIG. 6E, the column spacer 524 and white color filter pattern 522d are formed by developing the exposed negative type photoresist 526. Further, hardening treatment can be performed on the column spacer 524 and the white color filter pattern 522d after the developing to stabilize the column spacer 324. The column spacer 524 is overlapped with the black matrix 521. That is, the column spacer 524 is formed above the black matrix 521.

As described above, in the present invention of FIGS. 5-6E, the RGBW four-color structure, which further includes the white color filter pattern when compared with the related art RGB three-color structure, is improved by forming the white color filter pattern together with the column spacer at the same time or sequentially using the same material as the column spacer. As a result, manufacturing process can be simplified with a less number of operations, and manufacturing time and cost can be reduced to thereby increase production yield. Moreover, brightness of the display device can be increased by 50% owing to the white color filter pattern.

Though the IPS mode LCD device is exemplarily used to explain the present invention, the present invention is not limited to such and can be applied to a TN mode LCD device. In that case, a transparent conductive material such as indium-tin-oxide (ITO) or indium-zinc-oxide (IZO) may be deposited on the overcoat layer as a common electrode. Also, although not specifically mentioned, in addition to the elements discussed above, the LCD device of the present invention also includes other conventional elements cooperating with the elements discussed above. For example, it is understood that the LCD device of the present invention generally would include the first substrate with the gate lines, data lines, etc. and a liquid crystal layer between the first substrate and the substrate having the RGBW structure. Driving circuits may also be provided.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display (LCD) device comprising:
   a black matrix having a plurality of open regions on a substrate;
   a color filter layer including a first color filter pattern, a second color filter pattern, and a third color filter pattern that are formed in the open regions;
   an overcoat layer formed on the color filter layer;
   a column spacer formed in a first region on the overcoat layer; and
   a fourth color filter pattern formed in a second region on the overcoat layer.

2. The LCD device according to claim 1, wherein the first region defined on the overcoat layer corresponds to the black matrix.

3. The LCD device according to claim 1, wherein the second region defined on the overcoat layer corresponds to one of the open regions.

4. The LCD device according to claim 1, wherein the first, second, third and fourth color filter patterns are respectively red, green, blue, and white color filter patterns defining a unit pixel.

5. The LCD device according to claim 1, wherein the column spacer and the fourth color filter pattern are formed simultaneously.

6. The LCD device according to claim 1, wherein the column spacer and the fourth color filter pattern are formed of a same material.

7. The LCD device according to claim 6, wherein the material is a negative type photoresist having a transparent acryl.

8. The LCD device according to claim 1, wherein the first, second and third color filter patterns are formed directly on the substrate.

9. The LCD device according to claim 1, wherein the fourth color filter pattern is a white color filter pattern formed directly on the overcoat layer.

10. The LCD device according to claim 1, wherein a thickness difference between the fourth color filter pattern and the respective first, second, and third color filter patterns is about 0.2 μm or less.

11. The LCD device according to claim 1, wherein the LCD device is an in-plane switching (IPS) mode LCD device.

12. A method of manufacturing a liquid crystal display (LCD) device, the method comprising:
    forming a black matrix with a plurality of open regions on a substrate;
    forming first, second and third color filter patterns in the open regions;
    forming an overcoat layer on the substrate including the first, second and third color filter patterns; and
    forming a column spacer and a fourth color filter pattern on the overcoat layer.

13. The method according to claim 12, wherein the step of forming of the column spacer and the fourth color filter pattern comprises:
    coating the substrate including the first, second and third color filter patterns with a photosensitive material;
    aligning a mask on the substrate including the photosensitive material;
    projecting a first light and a second light toward top and bottom areas of the substrate, respectively; and
    forming the column space and the fourth color pattern using the first and second light.

14. The method according to claim 13, wherein the photosensitive material is a negative type photoresist.

15. The method according to claim 13, wherein in the step of aligning the mask, the mask comprises:
    a transmitting region allowing the first light to pass therethrough toward the black matrix; and
    an opaque region to block the first and/or second light.

16. The method according to claim 12, wherein the column space is formed directly on the overcoat layer at a region corresponding to the black matrix.

17. The method according to claim 13, wherein the second light projected to the bottom area of the substrate is blocked by the black matrix and the first, second and third color filter patterns, such that the second light is transmitted through a region where the black matrix and the first, second and third color filter patterns are not formed.

18. The method according to claim 13, wherein the first light and the second light are projected to the substrate at substantially the same time, such that the column spacer and the fourth color filter pattern are formed at substantially the same time.

19. The method according to claim 13, wherein the first light and the second light are sequentially projected to the substrate, such that the column spacer and the fourth color filter pattern are sequentially formed.

20. The method according to claim 12, wherein the first, second, third and fourth color filter patterns are respectively red, green, blue, and white color filter patterns defining a unit pixel.

21. The method according to claim 12, wherein a thickness difference between the fourth color filter pattern and the respective first, second and third color filter patterns is about 0.2 μm or less.

22. The method according to claim 12, further comprising forming a common electrode on the overcoat layer.

23. The method according to claim 12, wherein the fourth color filter pattern is a white color filter pattern formed directly on the overcoat layer.

24. A liquid crystal display (LCD) device comprising:
    a black matrix pattern on first regions of a substrate;
    first, second and third color filter patterns on second regions of the substrate;
    an overcoat layer to cover the substrate including the black matrix pattern and the first, second and third color filter patterns; and
    a fourth color filter pattern on the overcoat layer.

25. The LCD device according to claim 24, further comprising:
    at least one column spacer on the overcoat layer.

26. The LCD device according to claim 24, wherein the first, second, third and fourth color filter patterns are respectively red, green, blue, and white color filter patterns defining a unit pixel.

27. The LCD device according to claim 24, wherein the column spacer and the fourth color filter pattern are formed of a same material.

28. The LCD device according to claim 24, wherein the fourth color filter pattern is a white color filter pattern formed directly on the overcoat layer.

29. The LCD device according to claim 24, wherein the LCD device is an in-plane switching (IPS) mode LCD device.

30. A method of forming a liquid crystal display (LCD) device, the method comprising:
    forming a black matrix pattern on first regions of a substrate;
    forming first, second and third color filter patterns on second regions of the substrate;
    forming an overcoat layer to cover the substrate including the black matrix pattern and the first, second and third color filter patterns; and
    forming a fourth color filter pattern on the overcoat layer.

31. The method according to claim 30, further comprising:
    forming at least one column spacer on the overcoat layer.

32. The method according to claim 31, wherein the at least one column spacer and the fourth color filter pattern are formed simultaneously, and/or are formed of a same material.

33. The method according to claim 30, wherein the first, second, third and fourth color filter patterns are respectively red, green, blue, and white color filter patterns defining a unit pixel.

34. The method according to claim 30, wherein the fourth color filter pattern is a white color filter pattern formed directly on the overcoat layer.

* * * * *